United States Patent
Mirza et al.

(10) Patent No.: US 7,340,271 B2
(45) Date of Patent: Mar. 4, 2008

(54) DUAL INPUT MOBILE COMMUNICATION DEVICE

(75) Inventors: Naveed Mirza, Boynton Beach, FL (US); Paul Morningstar, N. Lauderdale, FL (US); Gene A. Santana, Boca Raton, FL (US); Chung T. Tong, Boynton Beach, FL (US)

(73) Assignee: Motorola Inc, Schaumburg, IL (US)

( * ) Notice: Subject to any disclaimer, the term of this patent is extended or adjusted under 35 U.S.C. 154(b) by 441 days.

(21) Appl. No.: 10/602,953

(22) Filed: Jun. 24, 2003

(65) Prior Publication Data
US 2004/0266475 A1  Dec. 30, 2004

(51) Int. Cl.
*H04M 1/00* (2006.01)

(52) U.S. Cl. ............... 455/550.1; 455/575.1; 455/575.3; 455/90.3; 455/566

(58) Field of Classification Search ............ 455/575.1, 455/550.1, 575.3, 90.3, 566, 575.4
See application file for complete search history.

(56) References Cited

U.S. PATENT DOCUMENTS

| | | | |
|---|---|---|---|
| 5,841,431 A | 11/1998 | Simmers | |
| 6,044,153 A | 3/2000 | Kaschke | |
| 6,069,593 A | 5/2000 | Lebby et al. | |
| 6,073,034 A | 6/2000 | Jacobsen et al. | |
| 6,141,436 A * | 10/2000 | Srey et al. | 382/124 |
| 6,222,520 B1 | 4/2001 | Gerszberg et al. | |
| 6,226,512 B1 | 5/2001 | Macaulay et al. | |
| 6,249,672 B1 | 6/2001 | Castiel | |
| 6,259,932 B1 * | 7/2001 | Constien | 455/556.1 |
| 6,449,492 B1 * | 9/2002 | Kenagy et al. | 455/550.1 |
| 6,559,825 B2 | 5/2003 | Jacobsen et al. | |
| 6,574,487 B1 | 6/2003 | Smith et al. | |
| 6,587,675 B1 * | 7/2003 | Riddiford | 455/557 |
| 6,714,802 B1 * | 3/2004 | Barvesten | 455/575.1 |
| 6,751,487 B1 * | 6/2004 | Rydbeck et al. | 455/575.3 |
| 6,931,265 B2 * | 8/2005 | Reyes et al. | 455/566 |
| 2003/0153371 A1 * | 8/2003 | Choi | 455/575 |
| 2003/0207701 A1 * | 11/2003 | Rolnik et al. | 455/564 |
| 2004/0008266 A1 * | 1/2004 | Kitada et al. | 348/211.13 |
| 2004/0067770 A1 * | 4/2004 | King et al. | 455/557 |
| 2004/0110490 A1 * | 6/2004 | Steele et al. | 455/412.1 |
| 2004/0229662 A1 * | 11/2004 | Chadha | 455/575.1 |

* cited by examiner

*Primary Examiner*—Joseph Feild
*Assistant Examiner*—Huy D Nguyen
(74) *Attorney, Agent, or Firm*—Gary J. Cunningham

(57) ABSTRACT

A dual input mobile communication device. The mobile communication device can include a housing having an exterior, the exterior including a first face side and a second face side, the second face side located on an opposite side of the housing from the first face side, a first display disposed on the first face side, a numeric keypad disposed on the first face side, a second display disposed on the second face side, and a text keypad disposed on the second face side. The numeric keypad can be a telephone keypad such as a dual-tone multiple-frequency (DTMF) keypad and text keypad can be a QWERTY keypad, such as a keypad having a layout similar to a typical typewriter-style keyboard. The housing can be a candy bar phone style housing.

18 Claims, 3 Drawing Sheets

DUAL INPUT MOBILE COMMUNICATION DEVICE

BACKGROUND

1. Field

The present disclosure is generally directed to a mobile communication device. More particularly, the present disclosure is directed to a dual input user interface for a mobile communication device.

2. Description of Related Art

Presently, mobile communication devices, such as cellular telephones, are becoming a common means of communication. For example, a mobile communication device can include a telephone keypad that a user actuates to place a telephone call to a friend. The user may also use the mobile communication device to send text messages to the friend. For example, alphanumeric characters are often assigned to a specific number of presses of specific numeric key. Thus, the user can perform text entry on a telephone keypad by pressing a numeric key a specific number of presses to obtain a desired alphanumeric character.

Unfortunately, pressing numeric keys numerous times for a specific character is inconvenient for the user. For example, numerous keypresses increases the amount of time necessary to compose a text message. The numerous keypresses also requires additional concentration by the user to keep track of the number of presses. The numerous keypresses further requires the user to frequently check a display to determine if the appropriate character has been entered.

Thus, there is a need for an mobile communication device that can provide for more convenient text entry functionality along with portable phone functionality.

BRIEF DESCRIPTION OF THE DRAWINGS

The preferred embodiments of the present invention will be described with reference to the following figures, wherein like numerals designate like elements, and wherein.

DETAILED DESCRIPTION OF PREFERRED EMBODIMENTS

Figure 1:
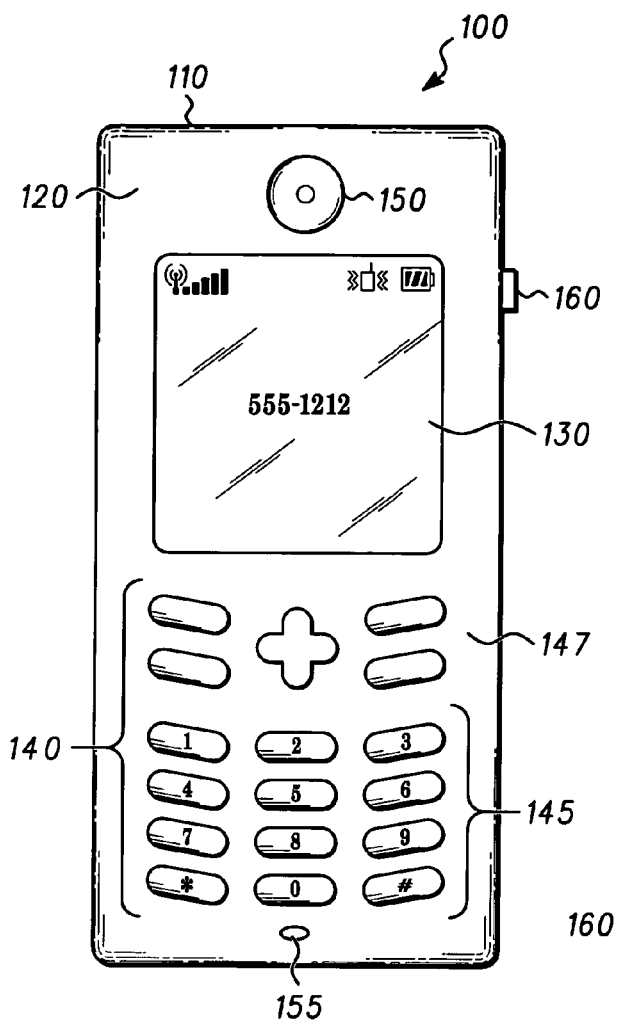
FIG. 1 is an exemplary illustration of a first face side of a mobile communication device according to one embodiment.

The disclosure provides a dual input mobile communication device. For example, the present disclosure provides a mobile communication device. The mobile communication device can include a housing having an exterior, the exterior including a first face side and a second face side, the second face side located on an opposite side of the housing from the first face side, a first display disposed on the first face side, a numeric keypad disposed on the first face side, a second display disposed on the second face side, and a text keypad disposed on the second face side. The numeric keypad can be a telephone keypad such as a dual-tone multiple-frequency (DTMF) keypad and text keypad can be a QWERTY keypad, such as a keypad having a layout similar to a typical typewriter-style keyboard. The housing can be a candy bar phone style housing. For example, the housing may not require hinges between active housing parts for normal operation, but the housing may use simple passive keypad covers. The second display can be a display configured to display at least one line of text.

The mobile communication device can also include a speaker disposed on the first face side, the speaker located on a first side of the first display and a microphone disposed on the first face side, the microphone located on a second side of the first display. The mobile communication device can additionally include a user interface including the numeric keypad, the user interface also including at least one mobile communication device input device and a controller coupled to the user interface, the first display, the second display, and the text keypad, the controller configured to receive signals from the user interface and activate and deactivate the text keypad based on the signals received from the user interface. The text keypad can be operated in a position orthogonal to a position of numeric keypad operation. For example, the numeric keypad can have a normal operating and viewing position in a portrait mode and the text keypad can have a normal operating and viewing position in a landscape mode. The mobile communication device can further include a third display disposed on the second face side, wherein the third display is configured to display at least one line of text. The second display can substantially surround the text keypad disposed on the second face side. The second display can be configured to display scrolling text by scrolling the text around the text keypad disposed on the second face side. The mobile communication device can also include a third side orthogonal to the first face side and the second face side, the third side coupled to the first face side and the second face side and an input lock button coupled to the third side, the input lock button configured to selectively lock and unlock input functionality of the numeric keypad and the text keypad.

According to another embodiment, the present disclosure provides a portable phone. The portable phone can include a unitary housing including a first face side and a second face side, the second face side facing an opposite direction from the first face side, a transceiver contained within the housing, a controller contained within the housing, the controller coupled to the transceiver, a user interface including a numeric keypad disposed on the first face side, the user interface also including at least one mobile communication device input device, the user interface coupled to the controller, and a text input device disposed on the second face side, the text input device coupled to the controller. The portable phone can also include a first display disposed on the first face side, the first display coupled to the controller and a second display disposed on the second face side, the second display coupled to the controller. The numeric keypad can be a telephone keypad and the text input device can be a QWERTY keypad. The controller can be configured to receive signals from the user interface and activate and deactivate the text input device based on the signals received from the user interface.

The portable phone can also include a third display disposed on the second face side, wherein the third display is configured to display at least one line of text. The second display can substantially surround the text input device disposed on the second face side. The second display can be configured to display scrolling text by scrolling the text around the text input device disposed on the second face side. The text input device can be a touchpad. The portable phone can additionally include a third side orthogonal to the first face side and the second face side, the third side coupled to the first face side and the second face side and an input lock button coupled to the third side, the input lock button configured to selectively lock and unlock input functionality of the numeric keypad and the text input device.

According to another embodiment, the present disclosure provides a mobile communication device. The mobile communication device can include a candy-bar style housing having a first face and a second face, the second face on an opposite side of the housing from the first face, means for inputting numbers coupled to the first face, means for displaying information coupled to the first face, and means for inputting text coupled to the second face. The mobile communication device can also include means for displaying text coupled to the second face and means for controlling the operation of the mobile communication device coupled to the means for inputting numbers, the means for displaying information, the means for inputting text, and the means for displaying text.

One aspect of the present disclosure can allow for more convenient text messaging on a portable phone. Another aspect of the present disclosure can allow for faster text entry on a portable phone. A further aspect of the present disclosure can allow for two separate keypads for numeric and text entry. An additional aspect of the present disclosure can allow for simplicity of operation of a mobile communication device because both keypads are familiar to users for their respective operations. Another aspect of the present disclosure can allow for a full QWERTY keypad on the back of a standard candy bar-style portable phone where one position of the phone is used for a voice call and another position is used for text messaging. A further aspect of the present disclosure can allow for this functionality without extensive reconfiguration of the housing and without requiring the attachment of additional devices such as an external keypad.

FIG. 1 is an exemplary illustration of a mobile communication device 100 according to one embodiment. The mobile communication device 100 can be a portable phone, a text messaging device, a personal digital assistant, or any other device capable of sending and receiving communication signals. The mobile communication device 100 can include a housing 110 having a first housing face side 120, a first display 130 located on the first housing face side 120, a user interface 140 including a numeric keypad 145 and mobile communication device input devices 147 located on the first housing face side 120, a speaker 150 located on a first side of the first display 130, a microphone 155 located on the second side of the first display 130, and an input lock button 160 located on a side of the housing 110 orthogonal to the first face side 120.

The housing 110 can be a candy bar-style housing. For example, the housing 110 can be a unitary housing with structure that is not substantially modified during normal mobile communication device operation. However, the housing 110 may be exchangeable with replacement housings. Also, the housing 110 may be a sub-housing that can receive removable external housings. The first display 130 can be a liquid crystal display (LCD), a light emitting diode (LED) display, a plasma display, or any other means for displaying information. The numeric keypad 145 can be a standard keypad with numbers, can be a dual-tone multiple-frequency (DTMF) telephone keypad, or can be any other means for inputting numbers.

In operation, calls can be placed from the mobile communication device 100 using the first face side 120 for typical portable phone operations. The numeric keypad 145 can be used for dialing telephone numbers and may also be used for other functions and text entry using standard portable phone techniques, such as multiple key presses. The mobile communication device input device 147 can be used for selection and navigation of functions of the mobile communication device 100. The user interface 140 can be used to selectively lock and unlock input functionality of the various input devices of the mobile communication device 100. Locking specific input devices can prevent inadvertent activation when a specific input device is not in use.

Figure 2:
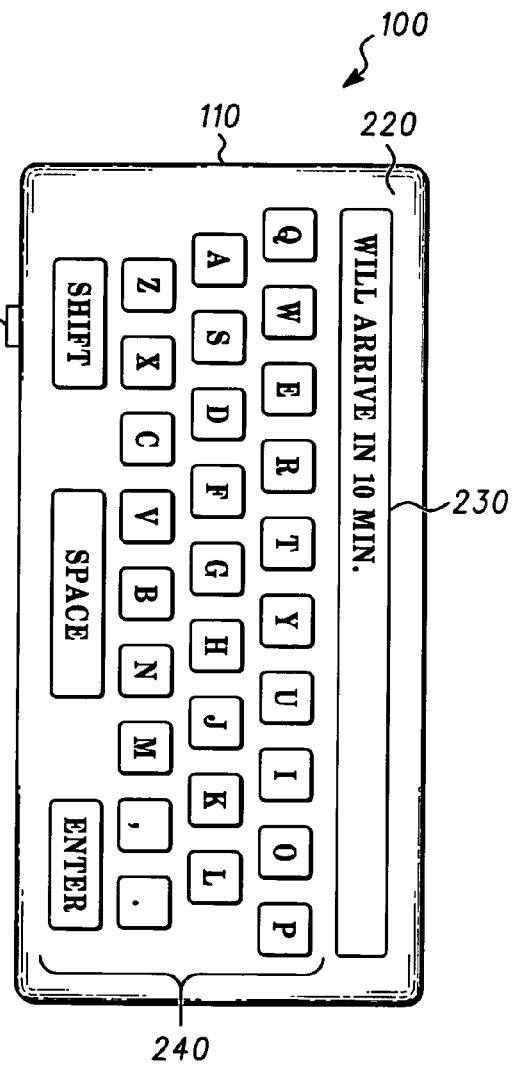
FIG. 2 is an exemplary illustration of a second face side of a housing of the mobile communication device according to one embodiment.

FIG. 2 is an exemplary illustration of a second face side 220 of the housing 110 of the mobile communication device 100 according to one embodiment. The second face side 220 can be located on an opposite side of the housing 110 from the first face side 120. The second face side 220 can include a second display 230 and a text keypad 240. The input lock button 160 can be located on a side of the housing 110 orthogonal to the second face side 220. The second display 230 can be a LCD, a LED display, a plasma display, or any other means for displaying information. The second display 230 can display at least one line of text, only one line of text, two lines of text, text and graphics, or any other data. The text keypad 240 can be a QWERTY typewriter-style keypad or any other text input keypad. The text keypad 240 can also be a button keypad, a keypad displayed on a display that uses sensors for text entry, a pressure sensitive touch pad, a touch screen, or any other means for inputting text.

In operation, the second face side 220 can be used for entering text. For example, the text keypad 240 can be used for ease of entering text of a text message. The second display 230 can be used to view messages being entered, stored messages, and received messages. The second display 230 may also be used to provide status, menu, and selection indications. The input lock button 160 can be used to selectively lock and unlock input functionality of the user interface 140, the mobile communication device input devices 147, the numeric keypad 145, and/or the text keypad 240. For example, the input lock button 160 can disable the user interface 140 and/or the numeric keypad 145 to allow for placement the mobile communication device 100 on a table for text entry on the text keypad 240 without activating the numeric keypad 145. The input lock button 160 can also disable the text keypad 240 when the mobile communication device 100 is used as a portable phone. The input lock button 160 can additionally disable various combinations of both the user interface 140 and the numeric keypad 240 for placing the mobile communication device 100 in a pocket or purse. This functionality may also be performed in a menu or using a soft key associated with an icon on a display. The mobile communication device 100 may also include a speakerphone for audible communications while inputting text on the text keypad 240.

Figure 3:
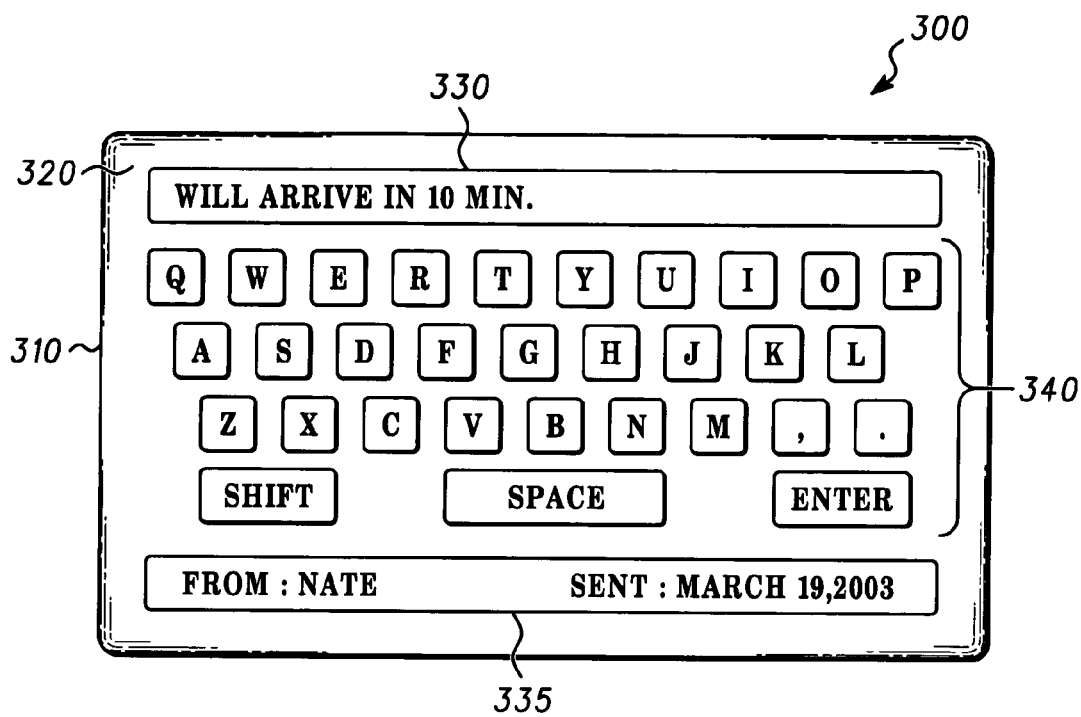
FIG. 3 is an exemplary illustration of a second face side of a housing of a mobile communication device according to another embodiment.

FIG. 3 is an exemplary illustration of a second face side 320 of a housing 310 of a mobile communication device 300 according to another embodiment. The second face side 320 can include a second display 330, a third display 335, and a text keypad 340. Similar elements operate in a similar manner to those disclosed above. Also, the third display 335 can be used to display additional text or graphics. For example, the third display 335 can display additional text of a message. Also, the third display 335 can display message status information, header information, sender information, or any other useful information. The third display 335 can display one line of text, multiple lines of text, or combinations of text and graphics.

Figure 4:
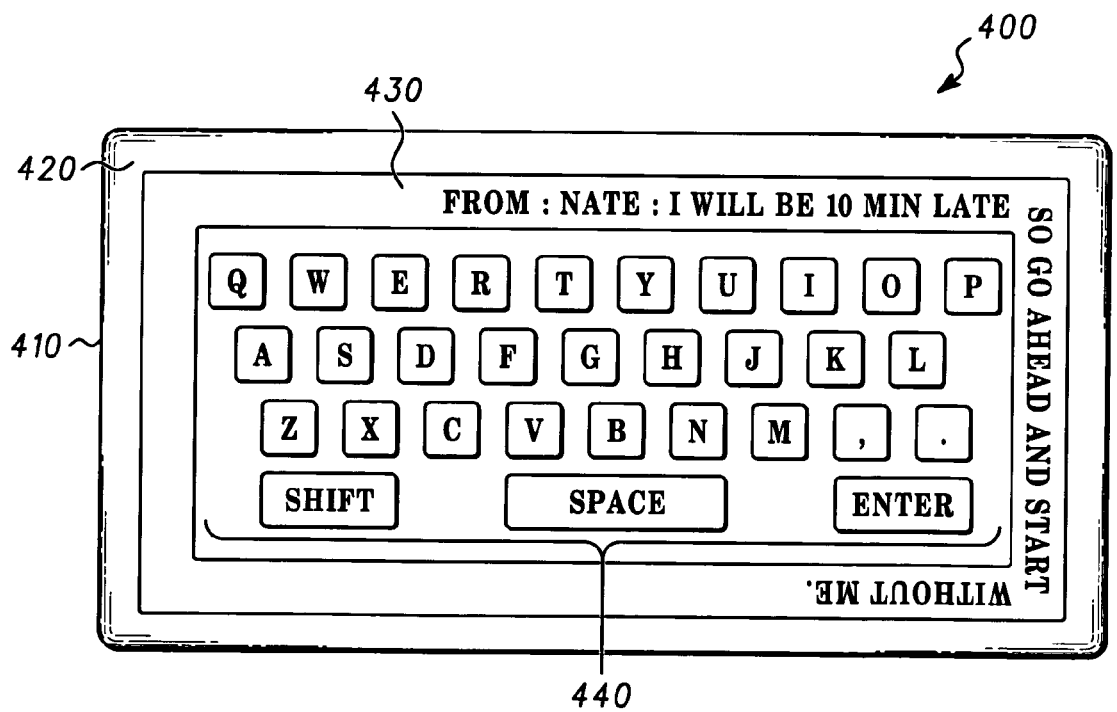
FIG. 4 is an exemplary illustration of a second face side of a housing of a mobile communication device according to another embodiment.

FIG. 4 is an exemplary illustration of a second face side 420 of a housing 410 of a mobile communication device 400 according to another embodiment. Similar elements can operate in a similar manner to those disclosed above. The second face side 420 can include a second display 430 and a text keypad 440. The second display 430 can substantially surround the text keypad 440. For example, the second display 430 can completely surround or partially surround the text keypad 440. The second display 430 can display text with the bottoms of characters always oriented towards the center of the face side 420. The second display 430 can also display text with the bottoms of characters always oriented towards a selected side of the second face side 420. For example, the second display 430 can display text with the characters in alignment with the text keypad 440. The second display 430 can additionally statically display text or can scroll text around the text keypad 440.

Figure 5:
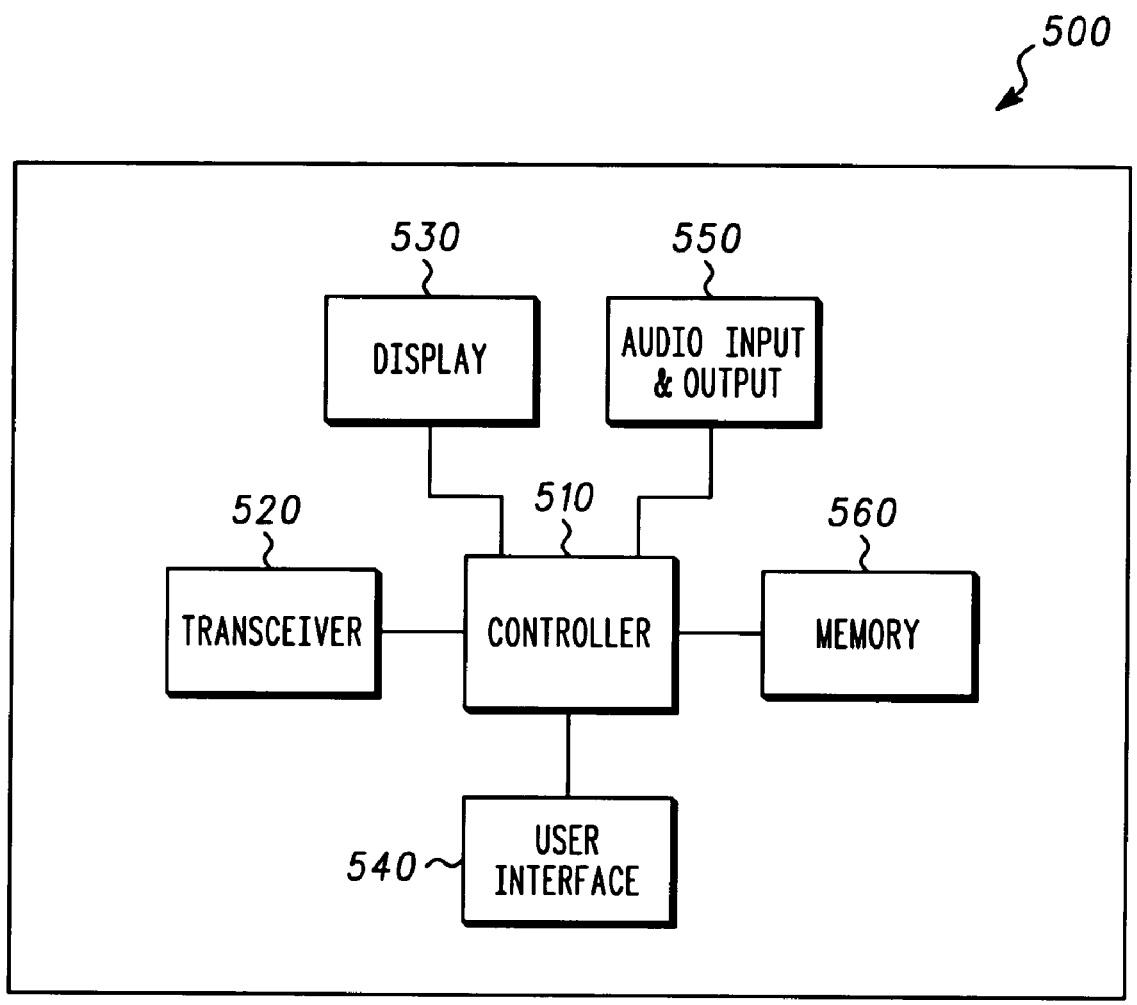
FIG. 5 is a block diagram of internal components of a mobile communication device according to an exemplary embodiment.

FIG. 5 is a block diagram of internal components of a mobile communication device 500 according to an exemplary embodiment. The mobile communication device 500 can include a controller 510, a transceiver 520, at least one display 530, a user interface 540, audio input and output devices 550, and a memory 560. The display 530 can include one display or multiple displays. The display 530 can also include one driver for each display or a single driver to control all displays. The audio input and output devices 550 can include a personal speaker, a speakerphone speaker, a microphone, or any other audio input and output devices. The transceiver 520 can include any combination of a transmitter and/or a receiver. The user interface 540 can include a numeric keypad, a text input device, an input lock button, or any other mobile communication device input devices. The memory 560 can store program codes and data. Many of the components of the mobile communication device 500 can be contained in a housing such as the housing 110. In operation, the controller 510 controls the operation of the mobile communication device 500. For example, the controller 510 can receive signals from the user interface 540 and can activate and deactivate input devices based on signals received from the user interface 540. The controller 510 can also control the display of information on the display 530. For example, the controller 520 can control text orientation and movement on the display 530.

The controller 510 of this invention is preferably implemented on a programmed processor. However, the controller 510 may also be implemented on a general purpose or special purpose computer, a programmed microprocessor or microcontroller and peripheral integrated circuit elements, an ASIC or other integrated circuit, a hardware electronic or logic circuit such as a discrete element circuit, a programmable logic device such as a PLD, PLA, FPGA or PAL, or the like. In general, any device on which resides a finite state machine capable of implementing the functions of the mobile communication device 100 may be used to implement the processor functions of this invention.

While this invention has been described with specific embodiments thereof, it is evident that many alternatives, modifications, and variations will be apparent to those skilled in the art. For example, various components of the embodiments may be interchanged, added, or substituted in the other embodiments. Accordingly, the preferred embodiments of the invention as set forth herein are intended to be illustrative, not limiting. Various changes may be made without departing from the spirit and scope of the invention.

What is claimed is:

1. A mobile communication device, comprising:
  a housing having an exterior, the exterior including a first face side and a second face side, the second face side located on an opposite side of the housing from the first face side;
  a first display disposed on the first face side;
  a numeric keypad disposed on the first face side;
  a second display disposed on the second face side; and
  a text keypad disposed on the second face side wherein the second display substantially surrounds the text keypad disposed on the second face side and the second display is configured to display scrolling text by scrolling the text around the text keypad disposed on the second face side.

2. The mobile communication device according to claim 1, wherein the numeric keypad comprises a telephone keypad and text keypad comprises a QWERTY keypad.

3. The mobile communication device according to claim 1, wherein the housing comprises a candy bar phone style housing.

4. The mobile communication device according to claim 1, wherein the second display comprises a display configured to display at least one line of text.

5. The mobile communication device according to claim 1, further comprising:
  a speaker disposed on the first face side, the speaker located on a first side of the first display; and
  a microphone disposed on the first face side, the microphone located on a second side of the first display.

6. The mobile communication device according to claim 1, further comprising:
  a user interface including the numeric keypad, the user interface also including at least one mobile communication device input device; and
  a controller coupled to the user interface, the first display, the second display, and the text keypad, the controller configured to receive signals from the user interface and activate and deactivate the text keypad based on the signals received from the user interface.

7. The mobile communication device according to claim 1, wherein the text keypad is operated in a position orthogonal to a position of numeric keypad operation.

8. The mobile communication device according to claim 1, further comprising a third display disposed on the second face side, wherein the third display is configured to display at least one line of text.

9. The mobile communication device according to claim 1, further comprising:
  a third side orthogonal to the first face side and the second face side, the third side coupled to the first face side and the second face side; and
  an input lock button coupled to the third side, the input lock button configured to selectively lock and unlock input functionality of the numeric keypad and the text keypad.

10. A portable phone, comprising:
  a unitary housing including a first face side and a second face side, the second face side facing an opposite direction from the first face side;
  a transceiver contained within the housing;
  a controller contained within the housing, the controller coupled to the transceiver;
  a user interface including a numeric keypad disposed on the first face side, the user interface also including at least one mobile communication device input device, the user interface coupled to the controller; and a text input device disposed on the second face side, the text input device coupled to the controller wherein the second display substantially surrounds the text keypad disposed on the second face side and the second display is configured to display scrolling text by scrolling the text around the text keypad disposed on the second face side.

11. The portable phone according to claim 10, further comprising:

a first display disposed on the first face side, the first display coupled to the controller; and a second display disposed on the second face side, the second display coupled to the controller.

12. The portable phone according to claim 10, wherein the numeric keypad comprises a telephone keypad and the text input device comprises a QWERTY keypad.

13. The portable phone according to claim 10, wherein the controller is configured to receive signals from the user interface and activate and deactivate the text input device based on the signals received from the user interface.

14. The portable phone according to claim 10, further comprising a third display disposed on the second face side, wherein the third display is configured to display at least one line of text.

15. The portable phone according to claim 10, wherein the text input device comprises a touch screen.

16. The portable phone according to claim 10, further comprising:

a third side orthogonal to the first face side and the second face side, the third side coupled to the first face side and the second face side; and an input lock button coupled to the third side, the input lock button configured to selectively lock and unlock input functionality of the numeric keypad and the text input device.

17. A mobile communication device comprising:

a candy-bar style housing having a first face side and a second face side, the second face side on an opposite side of the housing from the first face side;

means for inputting numbers coupled to the first face side;

means for displaying information coupled to the first face side; and means for inputting text coupled to the second face side wherein the second display substantially surrounds the text keypad disposed on the second face side and the second display is configured to display scrolling text by scrolling the text around the text keypad disposed on the second face side.

18. The mobile communication device according to claim 17, further comprising:

means for displaying text coupled to the second face side; and means for controlling the operation of the mobile communication device coupled to the means for inputting numbers, the means for displaying information, the means for inputting text, and the means for displaying text.

* * * * *